Aug. 8, 1933.  F. FERTSCH ET AL  1,921,972
CONTACT GLASS
Filed June 16, 1931

Inventors:
Ferdinand Fertsch
Hans Hartinger

Patented Aug. 8, 1933

1,921,972

UNITED STATES PATENT OFFICE 1,921,972

CONTACT GLASS

Ferdinand Fertsch and Hans Hartinger, Jena, Germany, assignors to the firm Carl Zeiss, Jena, Germany Application June 16, 1931, Serial No. 544,773, and in Germany June 28, 1930

2 Claims. (Cl. 88—54)

We have filed an application in Germany, June 28, 1930.

The cornea protruding to some extent from the eyeball requires the known contact glasses to consist of at least two parts of different meridional curves. Ametropia is corrected as a rule by means of the lens of lachrymal secretion forming between the surface of the cornea and the interior surface of the corneal part of the contact glass. According to the construction of the eye and to the degree of its ametropia sharp edges arise where two differently curved interior surfaces bound each other. These edges protrude more or less into the interior space provided by the contact glass and may severely disturb the eye by continuous irritation.

Although it has been tried to avoid this inconvenience by effectively rounding off the disturbing edge, this procedure would not always eliminate entirely the said irritation. The invention completely overcomes this drawback and consists therein that each two adjacent and differently curved interior surfaces of the contact glass are interconnected by means of an additional surface the meridional curve of which has a comparatively great radius of curvature and touches those of the two first said surfaces. It is advisable to give the meridional curve of the additional surface a radius of curvature greater than the radius of the corneal part. The additional surface is for instance a toric surface the meridional curve of which may go in or outward. The said surface is determined when one of the points with which it touches one of the meridional curves of the two adjacent interior surfaces of the contact glass is given. The contact glass has a specially simple form when the additional surface is conical, that is to say when the meridional curve of this surface is a straight line or, in other words, the arc of a circle having an infinitely great radius of curvature.

Figure 1:
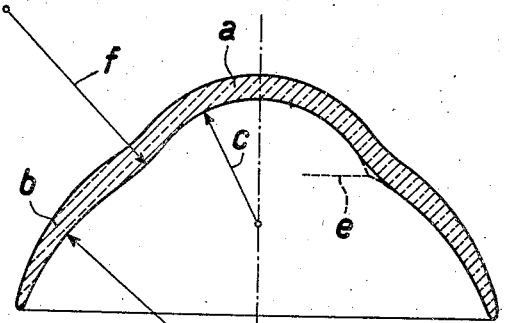
Figure 2:
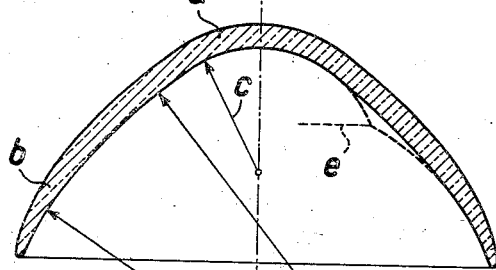
Figure 3:
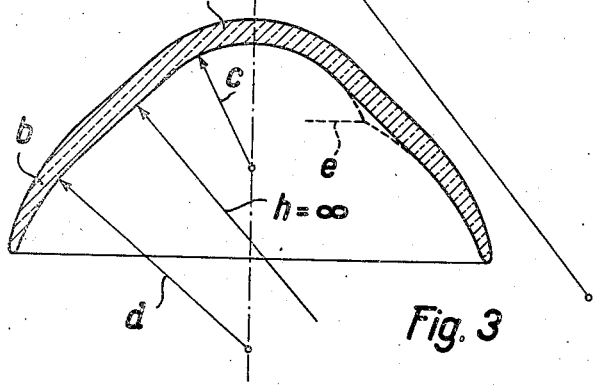

Figures 1, 2 and 3 of the accompanying drawing illustrate on an enlarged scale and in central sections constructional examples of three contact glasses according to the invention.

The contact glass has in all three examples a corneal part $a$ and a sclerotic part $b$ the interior surfaces of which have meridional curves with the radii of curvature $c$ and $d$, respectively. The dash-lines in the right part of the sectional figures represent the edges $e$ which would protrude into the interior of the contact glass where the surfaces bound each other.

In the first example (Fig. 1) a continuous transition from the corneal part $a$ to the sclerotic part $b$ is provided by means of an additional toric surface having an inward going meridional curve and a radius of curvature $f$ greater than the radius $c$ of the corneal part $a$.

In the second example (Fig. 2) an additional toric surface having an outward going meridional curve with a radius of curvature $g$ connects the corneal part $a$ with the sclerotic part $b$. The radius $g$ is greater than the radius $c$ of the corneal part $a$.

The third example (Fig. 3) shows the case lying between those represented by examples one and two, in which the additional connecting surface is a straight meridional curve, that is to say a curve having an infinitely great radius of curvature $h$.

The meridional curves of the additional interior surfaces of the contact glasses according to the drawing touch the meridional curves of the interior surfaces of the corneal parts $a$ and of the sclerotic parts $b$. The exterior bounding surface of the examples is so chosen that the glasses have everywhere approximately the same thickness of wall which gradually tapers towards the edge. While leaving the interior surfaces as described hereinbefore, the exterior surfaces may be given other suitable forms that allow of simplifying manufacture; the exterior surfaces may be composed for instance of two differently curved parts, or the said gradual tapering of the thickness towards the edge of the glass may be dispensed with.

We claim:

1. A contact glass, the interior surface of this contact glass consisting of a plurality of differently curved parts and additional parts, each additional part interconnecting two adjacent ones of the said differently curved parts and having a meridional curve which touches the meridional curves of the said adjacent parts, the radius of curvature of the meridional curve of the additional part being greater than that of the meridional curve of the corneal part.

2. A contact glass according to claim 1, the meridional curve of the additional part being a straight line.

FERDINAND FERTSCH.
HANS HARTINGER.